(12) United States Patent
Hayashi et al.

(10) Patent No.: US 6,939,250 B2
(45) Date of Patent: Sep. 6, 2005

(54) MULTI-PIECE GOLF BALL

(75) Inventors: Junji Hayashi, Chichibu (JP); Hisashi Yamagishi, Chichibu (JP); Yasumasa Shimizu, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 22 days.

(21) Appl. No.: 10/317,985

(22) Filed: Dec. 13, 2002

(65) Prior Publication Data

US 2003/0130060 A1 Jul. 10, 2003

(30) Foreign Application Priority Data

Dec. 17, 2001 (JP) ........................................ 2001-383190

(51) Int. Cl.$^7$ .................... A63B 37/04; A63B 37/06; A63B 37/12; A63B 37/14
(52) U.S. Cl. ........................ 473/377; 473/378
(58) Field of Search ................ 473/351–378

(56) References Cited

U.S. PATENT DOCUMENTS

| | | | |
|---|---|---|---|
| 5,439,227 A | | 8/1995 | Egashira et al. |
| 5,556,098 A | | 9/1996 | Higuchi et al. |
| 5,704,854 A | | 1/1998 | Higuchi et al. |
| 5,779,561 A | * | 7/1998 | Sullivan et al. ............. 473/373 |
| 6,159,110 A | | 12/2000 | Sullivan et al. |
| 6,162,134 A | | 12/2000 | Sullivan et al. |
| 6,204,331 B1 | | 3/2001 | Sullivan et al. |
| 6,210,292 B1 | * | 4/2001 | Higuchi et al. ............. 473/374 |
| 6,210,293 B1 | | 4/2001 | Sullivan |
| 6,231,460 B1 | * | 5/2001 | Higuchi et al. ............. 473/374 |
| 6,244,978 B1 | | 6/2001 | Higuchi et al. |
| 6,251,031 B1 | * | 6/2001 | Hayashi et al. ............. 473/376 |
| 6,277,036 B1 | * | 8/2001 | Hayashi et al. ............. 473/376 |
| 6,299,551 B1 | | 10/2001 | Higuchi et al. |
| 6,358,159 B1 | * | 3/2002 | Yamagishi et al. ......... 473/374 |
| 6,688,992 B2 | * | 2/2004 | Takemura et al. .......... 473/378 |
| 2001/0011046 A1 | | 8/2001 | Ichikawa et al. |

FOREIGN PATENT DOCUMENTS

| | | |
|---|---|---|
| JP | 06142228 A | 5/1994 |
| JP | 07024084 A | 1/1995 |
| JP | 09010358 A | 1/1997 |
| JP | 2000/070408 A | 3/2000 |
| JP | 2000/070409 A | 3/2000 |
| JP | 2000/070410 A | 3/2000 |
| JP | 2000/070411 A | 3/2000 |
| JP | 2000/070414 A | 3/2000 |
| JP | 2001/170213 A | 6/2001 |

\* cited by examiner

*Primary Examiner*—Gregory Vidovich
*Assistant Examiner*—Alvin A. Hunter, Jr.
(74) *Attorney, Agent, or Firm*—Sughrue Mion, PLLC

(57) ABSTRACT

A multi-piece golf ball includes a core having a diameter of 30 to 40 mm, at least one intermediate layer including the outermost layer having a thickness of 0.5 to 2.0 mm, and a cover having a thickness of 1.0 to 3.0 mm. The cover is made from a material obtained by dispersedly blending at least one kind of silicone powder selected from a silicone rubber powder, a silicon resin powder, and a composite powder thereof, in a main resin component containing an ionomer resin in an amount of 50% by weight or more. Dimples of the number of 300 to 550 pieces are formed in the surface of the golf ball in such a manner that a dimple total volume ratio VR is in a range of 0.85% or less. The multi-piece golf ball is excellent in resilience, flight distance characteristic, and feel of hitting.

5 Claims, No Drawings

MULTI-PIECE GOLF BALL

BACKGROUND OF THE INVENTION

The present invention relates to a multi-piece solid golf ball excellent in resilience and thereby flight distance characteristic, and feel of hitting.

Golf balls have been requited to be excellent in resilience and thereby flight performance, and feel of hitting upon shots and durability, and to meet such requirements, various kinds of golf balls have been proposed, for example, in Japanese Patent Laid-open Nos. Hei 7-24084, Hei 6-142228, Hei 9-10358, Hei 12-70408, Hei 12-70409, Hei 12-70410, Hei 12-70411, and Hei 12-70414.

The use of silicone materials for producing golf balls has been proposed, for example, in Japanese Patent Laid-open No. 2001-170213, and U.S. Pat. Nos. 6,159,110, 6,162,134, and 6,204,331. Such golf balls using silicon materials, however, have been recently required by golf players to be further improved in terms of resilience, feel of hitting, and durability.

SUMMARY OF THE INVENTION

In view of the foregoing, the present invention has been made, and an object of the present invention is to provide a multi-piece golf ball excellent in resilience and thereby flight distance characteristic, and further feel of hitting.

To achieve the above object of the present invention, according to an aspect of the present invention, there is provided a multi-piece golf ball including: a core having a diameter of 30 to 40 mm, the core being made from a rubber composition mainly containing polybutadiene; at least one intermediate layer including the outermost layer having a thickness of 0.5 to 2.0 mm, the outermost layer being made from a non-ionomer based thermoplastic resin; and a cover having a thickness of 1.0 to 3.0 mm, the cover being made from a material obtained by dispersedly blending at least one kind of silicone powder selected from a silicone rubber powder, a silicone resin powder, and a composite powder thereof, in a main resin component containing an ionomer resin in an amount of 50% by weight or more; wherein the core has a hardness corresponding to a deflection in a range of 3.5 to 6.5 mm under an applied load of 100 kg; the outermost layer of the at least one intermediate layer has a Dulometer D hardness in a range of 20 to 55, and the cover is harder than the outermost layer of the at least one intermediate layer and has a Dulometer D hardness in a range of 50 to 70; and dimples of the number of 300 to 550 pieces are formed in the surface of the golf ball in such a manner that a dimple total volume ratio $V_R$, which is a ratio of the total of volumes of dimple spaces under the planes surrounded by edges of the dimples in the surface of the golf ball to the total volume of a virtual ball as a result of assumption that no dimple is formed in the surface of the golf ball, is in a range of 0.85% or less.

An average particle size of the silicon powder is preferably in a range of 0.5 to 700 μm.

The content of the silicone powder is preferably in a range of 0.5 to 20 parts by weight on the basis of 100 parts by weight of the main resin component.

The outermost layer of the at least one intermediate layer preferably contains a thermoplastic polyester in an amount of 50% by weight or more.

The Durometer D hardness of the cover is preferably larger than the Durometer D hardness of the outermost layer of the at least one intermediate layer by 5 or more.

The rubber composition forming the core preferably contains an organic sulfur compound.

The cover preferably contains an inorganic filler.

The inorganic filler is preferably barium sulfate.

At least one kind of silicon powder selected from a silicone rubber powder, a silicone resin powder, and a composite powder thereof is preferably dispersedly blended in the resin material forming the outermost layer of the at least one intermediate layer.

According to the golf ball of the present invention, since the silicone powder is dispersedly blended in the cover, it is possible to improve the resilience, flight performance, and temperature dependency of the ball. In addition, since each of the core and the at least one intermediate layer is soft, the initial condition upon hitting can be set with a low spin rate and a high launch angle, to increase the flight distance of the ball, and the feel of hitting upon full-shot with a driver becomes very soft. Also, since the dimple total volume is optimized, it is possible to prevent occurrence of a drop phenomenon of the trajectory of the ball due to a low spin rate, and hence to obtain a good flight distance characteristic due to optimization of the trajectory of the ball. Further, since the core contains an organic sulfur compound, it is possible to improve the resilience of the core, and since the cover contains an inorganic filler, especially, barium sulfate, it is possible to improve the durability of the cover against cracking.

DESCRIPTION OF THE PREFERRED EMBODIMENTS

The present invention will be more fully described below.

The multi-piece golf ball of the present invention includes a core, at least one intermediate layer, and a cover.

The core is formed from a rubber composition containing a main rubber component. The main rubber component mainly contains polybutadiene which preferably contains 40% or more, especially, 90% or more of cis-1,4-bonds. The main rubber component may contain, in addition to polybutadiene, a diene based rubber such as polyisoprene rubber, styrene-butadiene rubber, or natural rubber. The content of polybutadiene in the main rubber component is preferably in a range of 50% ("% by weight", the same applying correspondingly to the following) or more, especially, 70% or more.

The rubber composition used herein contains, in addition to the main rubber component, a crosslinking agent, preferably, in an amount of 15 to 40 parts ("parts by weight", the same applying correspondingly to the following) on the basis of 100 parts of the main rubber component. The crosslinking agent may be selected from zinc salts, magnesium salts, and other metal salts of unsaturated fatty acids such as zinc acrylate and zinc methacrylate, esters such as triethanolpropane methacrylate, and unsaturated fatty acids such as methacrylic acids.

The rubber composition may also contain an organic peroxide such as dicumyl peroxide, preferably, in an amount of 0.1 to 3 parts on the basis of 100 parts of the main rubber component. To improve the resilience of the core, the rubber composition may further contain a vulcanizing agent such as an organic sulfur compound, for example, zinc salt of pentachlorothiophenol or diphenyldisulfide in an amount of 0.01 to 5 parts, especially, 0.2 to 3 parts on the basis of 100 parts of the main rubber component.

The rubber composition may further contain, if needed, an antioxidant such as 2,2-methylene bis(4-methyl-6-tert-buthylphenol), and a filler for adjustment of a specific gravity, such as zinc oxide, barium sulfate, or calcium carbonate. The filler may be generally contained in the main rubber component in an amount of 130 parts or less on the basis of 100 parts of the main rubber component. In particular, to improve the resilience of the core, the filler may be contained in the main rubber component in an amount of, preferably, 50 parts or less, more preferably, 45 parts or less, especially, 40 parts or less on the basis of 100 parts of the main rubber component. The lower limit of the content of the filler may be set to 1 part or more, especially, 3 parts or more, and further, 20 parts or more.

The core can be prepared from the above-described rubber composition, for example, by kneading the components of the rubber composition in an ordinary kneader such as a Banbury mixer or a roll mill, and molding the resultant compound into a desired shape by a compression molding process or an injection molding process. In this molding process, vulcanization can be performed at a temperature of 130 to 180° C. for 10 to 60 min.

The deflection (corresponding to hardness) of the core under an applied load of 100 kg may be in a range of 3.5 mm or more, preferably, 3.8 mm or more, more preferably, 4.0 mm or more, with the upper limit thereof being set to 6.0 mm or less, preferably, 5.8 mm or less, more preferably, 5.5 mm or less. Too small a deflection of the core (too large a hardness of the core) tends to give a hard feel of hitting the ball, and to increase the spin rates upon full-shots to reduce the flight distance of the ball. Too large a deflection of the core (too small a hardness of the core) tends to reduce the resilience and durability of the core.

The diameter of the core may be in a range of 30 mm or more, preferably, 32 mm or more, more preferably, 35 mm or more, with the upper limit thereof being set to 40 mm or less, preferably, 39.5 mm or less, more preferably, 39 mm or less. Too small a diameter of the core tends to reduce the resilience of the core and give a hard feel of hitting the ball, whereas too large a diameter of the core tends to reduce the resilience and durability of the core.

The at least one intermediate layer, which may be only one layer, is formed around the core configured as described above. The outermost layer of the at least one intermediate layer (which becomes the at least one intermediate layer itself if the at least one intermediate layer is composed of only one layer) is made from a non-ionomer based thermoplastic resin. An appropriate non-ionomer based thermoplastic resin may be one kind or a combination of two kinds or more selected from thermoplastic polyesters and thermoplastic polyamides. To obtain the outermost layer having both the resilience and the flexibility, the non-ionomer based thermoplastic resin as the material for forming the outermost layer may contain a thermoplastic polyester in an amount of 50% or more, preferably, 70% or more, more preferably, 90% or more. An appropriate thermoplastic polyester is commercially available, for example, as Hytrel from DuPont-Toray Co., Ltd.

The Durometer D hardness of the outermost layer of the at least one intermediate layer thus prepared is measured under JIS K-7215. It is to be noted that in this embodiment, the measurement of the Durometer D hardness of the other component, that is, the cover to be described later is also performed under JIS K-7215. To be more specific, the Durometer D hardness of the outermost layer of the at least one intermediate layer may be in a range of 20 or more, preferably, 25 or more, more preferably, 28 or more, with the upper limit thereof being set to 55 or less, preferably, 50 or less, more preferably, 48 or less. Too small a hardness of the outermost layer of the at least one intermediate layer tends to reduce the resilience and durability of the outermost layer, whereas too large a hardness of the outermost layer tends to give a hard feel of hitting the ball.

If the at least one intermediate layer is composed of two or more layers, each of inner layers other than the outermost layer may be formed from the same material as that used for forming the outermost layer and may have the same hardness as that of the outermost layer.

The thickness of the outermost layer of the at least one intermediate layer may be in a range of 0.5 mm or more, preferably, 0.6 mm or more, more preferably, 0.7 mm or more, with the upper limit thereof being set to 2.0 mm or less, preferably, 1.8 mm or less, more preferably, 1.6 mm or less. Too small a thickness of the outermost layer of the at least one intermediate layer tends to give a hard feel of hitting the ball because the at least one intermediate layer, which is the soft component of the ball, becomes thin, whereas too large a thickness of the outermost layer tends to reduce the resilience of the outermost layer.

The cover is formed from a material using a main resin component so as to cover the at least one intermediate layer. The main resin component may contain an ionomer resin in an amount of 50% or more, preferably, 55% or more, more preferably, 60% or more. Too small a content of the ionomer resin tends to reduce the resilience of the cover.

The main resin component used for forming the cover may contain a thermoplastic elastomer having a crystalline polyethylene block in an amount of 50% or less, preferably, 45% or less, more preferably, 40% or less, with the lower limit thereof being set to 0%, preferably, 3% or more, more preferably, 5% or more. The blend of the thermoplastic elastomer having a crystalline polyethylene block in the main resin component is effective to improve the resilience of the cover. An appropriate thermoplastic elastomer having a crystalline polyethylene block is commercially available, for example, as Dynaron from JSR Corporation.

To improve flowability and thereby facilitate injection molding, the main resin component may also contain an ethylene-(meth)acrylic acid-acrylate copolymer in an amount of 3% or more, especially, 5% or more, with the upper limit thereof being set to 50% or less, especially, 45% or less. An appropriate ethylene-(meth)acrylic acid-acrylate copolymer is commercially available, for example, as Nucrel from DuPont-Mitsui Polychemicals Co., Ltd.

As a feature of the present invention, a silicone powder is dispersedly blended in the cover by dispersedly blending at least one kind of silicone powder (which is a powder of previously hardened silicone) selected from a silicone rubber powder, a silicone resin powder, and a composite powder thereof in the material forming the cover.

An appropriate silicone rubber powder is exemplified by a fine powder having a highly polymerized three-dimensional structure, which is obtained by crosslinking linear dimethyl polysiloxane and/or methylphenyl polysiloxane added with 0.05 mole % or more of vinyl groups by using methyl hydrogen polysiloxane as a crosslinking agent, and a powder modified therefrom. In addition, the silicone rubber powder used herein is preferable to have a true specific gravity of about 0.97. Examples of such a silicone rubber powder include commercially available products such as KMP597, 598, 594, and 595 (spherical type) and X-52-875 (amorphous type) from Shin-Etsu Chemical Co., Ltd.

An appropriate silicone resin powder is exemplified by a fine powder of hardened polyorgano silsesquioxanes obtained by hardening siloxane bonds in a three-dimensional network expressed by a formula $(RSiO_{3/2})_n$, and a powder modified therefrom. In the formula, it is recommended that R be $CH_3$, $C_6H_5$, or a long-chain alkyl group. In addition, the silicone resin powder used herein is preferable to have a true specific gravity of about 1.3. Examples of such a silicone resin powder include commercially available products such as KMP590, X-52-1186, and X-52-854 (spherical type), and X-52-821, X-52-830, and X-52-831 (modified type, for example, modified with vinyl groups, epoxy groups, amino groups, and the like) produced by Shin-Etsu Chemical Co., Ltd.

An appropriate composite powder is exemplified by a powder obtained by covering the above silicone rubber powder with the above silicone resin, and a powder modified therefrom. In addition, the silicone composite powder used herein is preferable to have a true specific gravity of 1.0 to 0.98. Examples of such a silicone composite powder include commercially available products such as KMP600 and X-52-1139G produced by Shin-Etsu Chemical Co., Ltd.

The silicone powder used herein may be in the form of either amorphous particles or spherical particles, although the silicone powder in the form of spherical particles is preferred.

Either of the silicone powders is recommended to have an average particle size in a range of, generally, 0.5 μm or more, preferably, 1 μm or more, more preferably, 3 μm or more, with the upper limit thereof being set to 700 μm or less, preferably, 500 μm or less, more preferably, 100 μm or less. Too small an average particle size of the silicone powder tends to cause a large amount of scattering of the powder in the dispersion step, which is undesirable for production of the cover, whereas too large an average particle size of the silicone powder tends to degrade scattering of the silicone powder and thereby reduce the durability of the cover against repetitive shots.

The content of the silicone powder may be in a range of 0.5 part or more, preferably, 0.8 part or more, more preferably, 1 part or more on the basis of 100 parts of the main resin component, with the upper limit thereof being set to 20 parts or less, preferably, 15 parts or less, more preferably, 8 parts or less on the basis of 100 parts of the main resin component. Too small a content of the silicone powder fails to sufficiently achieve the effect of adding the silicone powder as the feature of the present invention, whereas too large a content of the silicone powder tends to cause a difficulty in uniform dispersion of the silicone powder, and thereby reduce the resilience of the cover and the durability of the cover.

The main resin component may further contain an inorganic filler. This is effective to improve the durability of the ball against cracking. A preferred inorganic filler is barium sulfate. The content of the inorganic filler may be in a range of 3 to 30 parts, especially, 5 to 25 parts on the basis of 100 parts by the main resin component.

The hardness of the cover should be highest among the components of the golf ball, that is, be higher than the outermost layer of the at least one intermediate layer. The Durometer D hardness of the cover may be in a range of 50 or more, preferably, 53 or more, more preferably, 55 or more, with the upper limit thereof being set to 70 or less, preferably, 68 or less, more preferably, 65 or less, and further it may be higher than the Durometer D hardness of the outermost layer of the at least one intermediate layer by 5 or more, preferably, 10 or more, more preferably, 15 or more. Too small a hardness of the cover tends to reduce the resilience of the cover, whereas too large a hardness of the cover tends to give a hard feel of hitting the ball. On the other hand, too small a difference in hardness between the cover and the outermost layer of the at least one intermediate layer often fails to keep a pleasant feel of hitting the ball in combination with a good resilience of the ball.

The hardness of each of the at least one intermediate layer and the cover is the value obtained by measuring the hardness of a sheet formed from the same material as that of each the at least one intermediate layer and the cover under JIS K-7215.

The thickness of the cover may be in a range of 1.0 mm or more, preferably, 1.2 mm or more, more preferably, 1.5 mm or more, with the upper limit thereof being set to 3.0 mm or less, preferably, 2.5 mm or less, more preferably, 2.3 mm or less. Too small a thickness of the cover tends to reduce the resilience and durability of the cover, whereas too large a thickness of the cover tends to give a hard feel of hitting the ball.

The above-described silicone powder may be dispersedly blended in the outermost layer of the at least one intermediate layer, if needed.

The multi-piece golf ball of the present invention can be produced in accordance with a known method, and can be subjected to polishing, painting, and the like after formation of the cover in accordance with a known method.

Like conventional golf balls, the multi-piece golf ball of the present invention has, on its surface, a multiplicity of dimples. The number of the dimples may be in a range of 300 or more, preferably, 320 or more, more preferably, 340 or more, with the upper limit thereof being set to 550 or less, preferably, 520 or less, more preferably, 500 or less. Too small the number of the dimples fails to ensure a sufficient total volume of the dimples, whereas too large the number of the dimples reduces the size of each dimple, which is liable to be affected by the paint to be applied on the surface of the golf ball, thereby failing to sufficiently achieve the ball characteristics.

With respect to the dimples formed in the surface of the golf ball, a dimple total volume ratio $V_R$, which is a ratio of the total of volumes of dimple spaces under the planes surrounded by edges of the dimples in the surface of the gold ball to the total volume of a virtual ball as a result of assumption that no dimple is formed in the surface of the golf ball, may be in a range of 0.85% or less, preferably, 0.84% or less, more preferably, 0.83% or less, with the lower limit thereof being set to 0.60% or more, especially, 0.65% or more. Too large the simple total volume ratio $V_R$ tends to make the trajectory of the ball lower, which may cause a drop phenomenon as a result of combination of the reduced spin rate, thereby reducing the flight distance of the ball, whereas too small the dimple total volume ratio $V_R$ tends to make the trajectory of the ball higher, which may cause an inconvenience that the flight distance of the ball be reduced and also the ball be liable to be affected by wind.

The multi-piece golf ball of the present invention may be formed in accordance with the Rules of Golf, that is, with the diameter set to 42.67 mm or more and the weight set to 45.93 g or less.

The multi-piece golf ball of the present invention configured as described above is excellent in resilience, flight distance characteristic, and feel of hitting.

EXAMPLE

The present invention will be described in more detail with reference to the following examples and comparative examples, although not limited thereto.

Examples and Comparative Examples

In accordance with a known golf ball production process, multi-piece golf balls having dimensional and other characteristics shown in Table 3 were each produced by the steps of forming a core by using a material shown in Table 1, forming an intermediate layer around the core by using a material shown in Table 2, and forming a cover around the intermediate layer by using a material shown in Table 2.

Results of evaluating the characteristics of each of the multi-piece golf balls thus obtained are shown in Table 3.

TABLE 1

Composition of Material for Core (parts by weight)

|  | Example | | | Comparative Example | | | | |
| --- | --- | --- | --- | --- | --- | --- | --- | --- |
|  | 1 | 2 | 3 | 1 | 2 | 3 | 4 | 5 |
| 1,4-polybutadiene (cis-structure) | 100 | 100 | 100 | 100 | 100 | 100 | 100 | 100 |
| Zinc acrylate | 24.0 | 23.0 | 25.5 | 24.0 | 22.0 | 25.5 | 24.0 | 28.9 |
| Dicumyl peroxide | 1.4 | 1.4 | 1.4 | 1.4 | 1.4 | 1.4 | 1.4 | 1.4 |
| Antioxidant | 0.2 | 0.2 | 0.2 | 0.2 | 0.2 | 0.2 | 0.1 | 0.1 |
| Zinc oxide | 25.9 | 17.4 | 24.9 | 25.9 | 26.7 | 24.9 | 24.7 | 20.4 |
| Zinc salt of pentachlorothiophenol | 0.4 | 0.4 | 1.0 | 0.4 | 0.4 | 1.0 | 0.2 | 0.2 |

TABLE 2

Compositions of Materials for Intermediate Layer and Cover (parts by weight)

|  | Example | | | Comparative Example | | | | |
| --- | --- | --- | --- | --- | --- | --- | --- | --- |
|  | 1 | 2 | 3 | 1 | 2 | 3 | 4 | 5 |
| (material for intermediate layer) | | | | | | | | |
| Hytrel 4767 | 100 | 100 | 100 | 100 | 100 | 100 | | |
| Hytrel 4047 | | | | | | | 100 | |
| (material for cover) | | | | | | | | |
| Himilan 1706 | 48.5 | | | | | | 48.5 | |
| Himilan 1605 | 48.5 | | | | | | 48.5 | |
| Himilan 1557 | | 43.3 | 49 | 52 | 52 | | | |
| Himilan 1601 | | 40 | 46 | 48 | 48 | | | |
| Himilan AM7311 | | | | 30 | | | | |
| Surlyn AD8542 | | | | | 55 | | | 40 |
| Surlyn 7930 | | | | | | 37 | | |
| Nucrel 1560 | | | | | | 15 | | |
| Nucrel AN4811 | | | | | | 23 | | |
| KMP597 | 3 | 4.2 | 5 | | | | 3 | |
| Barium sulphate | | 12.5 | | | | | | |

While not shown in Table 2, a UV absorber, an antioxidant, a dispersion auxiliary, and a coloring agent were suitably added to the materials shown in Table 2.

The terms "Surlyn", "Himilan", "Nucrel", "Hytrel", and "KMP597" shown in Table 2 are the trade names of the commercially available products sold by the following makers:

Surlyn: EI DuPont de Nemours & Company
Himilan: DuPont-Mitsui Polychemicals Co., Ltd.
Nucrel: DuPont-Mitsui Polychemicals Co., Ltd.
Hytrel: DuPont-Toray Co., Ltd.
KMP597: silicone rubber powder (spherical type, average particle size: 5 μm), Shin-Etsu Chemical Co., Ltd.

TABLE 3

|  |  | Example | | | Comparative Example | | | | |
| --- | --- | --- | --- | --- | --- | --- | --- | --- | --- |
|  |  | 1 | 2 | 3 | 1 | 2 | 3 | 4 | 5 |
| Core | Outer diameter (mm) | 35.2 | 35.2 | 35.2 | 35.2 | 35.2 | 35.2 | 35.2 | 38.9 |
|  | Weight (g) | 27.1 | 26.0 | 27.1 | 27.1 | 27.1 | 27.1 | 27.0 | 36.0 |
|  | Hardness (mm) | 4.4 | 4.8 | 4.3 | 4.4 | 4.8 | 4.3 | 3.9 | 2.9 |
| Intermediate Layer | Thickness (mm) | 1.7 | 1.7 | 1.7 | 1.7 | 1.7 | 1.7 | 1.7 | |
|  | Hardness (D) | 47 | 47 | 47 | 47 | 47 | 47 | 40 | |
| Cover | Thickness (mm) | 2.0 | 2.0 | 2.0 | 2.0 | 2.0 | 2.0 | 2.0 | 1.9 |
|  | Hardness (D) | 60 | 60 | 55 | 60 | 60 | 55 | 60 | 51 |
| Product | Outer diameter (mm) | 42.7 | 42.7 | 42.7 | 42.7 | 42.7 | 42.7 | 42.7 | 42.7 |
|  | Weight (g) | 45.4 | 45.4 | 45.4 | 45.4 | 45.4 | 45.4 | 45.2 | 45.2 |
| Dimple | Number (pieces) | 432 | 432 | 392 | 432 | 432 | 392 | 392 | 392 |
|  | $V_R$(%) | 0.77 | 0.77 | 0.78 | 0.77 | 0.77 | 0.78 | 0.91 | 0.78 |
| Flight | Backspin (rpm) | 2570 | 2500 | 2610 | 2550 | 2510 | 2600 | 2650 | 3050 |
|  | Launch angle (degree) | 10.8 | 11.0 | 10.8 | 10.8 | 11.0 | 10.7 | 10.7 | 10.4 |
|  | Flight distance (m) | 232.5 | 232.0 | 231.5 | 229.0 | 228.0 | 227.5 | 227.0 | 226.0 |
|  | Initial velocity (m/s) at 23° C. | 65.5 | 65.3 | 65.4 | 64.9 | 64.8 | 64.8 | 65.5 | 65.4 |

TABLE 3-continued

|  |  | Example | | | Comparative Example | | | | |
| --- | --- | --- | --- | --- | --- | --- | --- | --- | --- |
|  |  | 1 | 2 | 3 | 1 | 2 | 3 | 4 | 5 |
|  | Initial velocity (m/s) at 0° C. | 64.8 | 64.6 | 64.7 | 63.8 | 63.7 | 63.7 | 64.8 | 64.3 |
| Feel of Hitting | Driver | ○ | ⊚ | ⊚ | ○ | ⊚ | ⊚ | ○ | X |
| Durability |  | Δ | ⊚ | ⊚ | Δ | X | ○ |  | ○ |

The hardness and thickness of each of the core, intermediate layer, and cover, and ball characteristics shown in Table 3 were determined as follows:

[Hardness of Core]

The hardness of the core was determined by measuring a deflection of the core under an applied load of 100 kg.

[Outer Diameter of Core]

The outer diameter of the core was determined by measuring outer diameters of 5 points on the surface of the core and averaging the measured values.

[Outer Diameter of Intermediate Layer]

The outer diameter of the intermediate layer was determined by measuring outer diameters of five points on the surface of the intermediate layer and averaging the measured values.

[Thickness of Intermediate Layer]

The thickness of the intermediate layer was determined by an expression of (outer diameter of intermediate layer−outer diameter of core)÷2.

[Hardness of Intermediate Layer]

The hardness of the intermediate layer was determined by preparing a sheet made from the same material as that of the intermediate layer and measuring the hardness of the sheet by the Durometer D hardness meter.

[Outer Diameter of Ball Product]

The outer diameter of the ball product was determined by measuring the outer diameters of five points on land portions (with no dimples) of the ball product and averaging the measured values.

[Hardness of Cover]

The hardness of the cover was determined by preparing a sheet made from the same material as that of the cover and measuring the hardness of the sheet by the Durometer D hardness meter.

[Thickness of Cover]

The thickness of the cover was determined by an expression of (outer diameter of ball product−outer diameter of intermediate layer)÷2. It is to be noted that if the multi-piece golf ball is a two-piece golf ball, the thickness of the cover is specified by an expression of (outer diameter of ball product−outer diameter of core)÷2.

[Flight Performance]

The flight performance was evaluated from results of a test performed using a hitting machine (club: driver, head speed: 45 m/s). In this test, the spin rate, initial speed at each of 23° C. and 0° C., launch angle were measured by using a high-speed camera.

[Feel of Hitting]

The feel of hitting the golf ball was evaluated from results of a test performed by hitting the ball with a driver by each of five top amateur players.

⊚: very soft
○: soft
X: hard

[Durability]

The durability of the golf ball against cracking was evaluated from results of a test performed by repeatedly hitting the ball at a head speed of 40 m/s. In this test, five balls were hit for each kind of the golf balls prepared in Examples and Comparative Examples.

The evaluation was made in comparison with the durability of a golf ball in Comparative Example 4.

○: superior to ball in Comparative Example 4
X: inferior to ball in Comparative Example 4

From the results shown in Table 3, the following becomes apparent.

Comparative Example 1

Since the hardness of each layer of the golf ball in Comparative Example 1 is the same as that of each layer of the golf ball in Example 1, the feel of hitting and the durability against cracking of the golf ball in Comparative Example 1 are comparable to those of the golf ball in Example 1. On the other hand, in the golf ball in Comparative Example 1, when compared with the golf ball in Example 1, the resilience of the cover and accordingly the resilience of the ball is poor, to reduce the flight distance of the golf ball, and further the temperature dependency of the golf ball is poor.

Comparative Example 2

Since the hardness of each layer of the golf ball in Comparative Example 2 is the same as that of each layer of the golf ball in Example 2, the feel of hitting in Comparative Example 2 is comparable to that of the golf ball in Example 2. On the other hand, in the golf ball in Comparative Example 2, when compared with the golf ball in Example 2, the resilience of the cover and accordingly the resilience of the ball is poor, to reduce the flight distance of the golf ball, the temperature dependency of the golf ball is poor, and the durability is poor (the golf ball in Example 2 is intended to improve the durability by adding the filler having a high specific gravity (barium sulfate) in the cover).

Comparative Example 3

Since the hardness of each layer of the golf ball in Comparative Example 3 is the same as that of each layer of the golf ball in Example 3, the feel of hitting and the durability against cracking of the golf ball in Comparative Example 3 are comparable to those of the golf ball in Example 3. On the other hand, in the golf ball in Comparative Example 3, when compared with the golf ball in Example 3, the resilience of each of the cover and the intermediate layer and accordingly the resilience of the ball is poor, to reduce the flight distance of the golf ball, and further the temperature dependency of the golf ball is poor.

Comparative Example 4

The golf ball in Comparative Example 4 has a ball configuration similar to that of the golf ball disclosed in Japanese Patent Laid-open No. 2001-170213, wherein the total dimple volume is not optimized. Such a golf ball fails to obtain a sufficient lift, which causes a drop phenomenon, to reduce the flight distance of the ball.

Comparative Example 5

The golf ball in Comparative Example 5 is a general spin type two-piece golf ball, and is inferior to the golf ball in each of Examples 1, 2 and 3 in terms of flight distance due to a large spin rate, and further the golf ball in Comparative Example 5 gives a hard feel when hit with a driver.

On the contrary, the golf ball in each of Examples 1, 2 and 3 exhibits good flight performance, feel of hitting, and durability.

While the preferred embodiment and examples of the present invention have been described using specific terms, such description is for illustrative purposes only, and it is to be understood that changes and modifications may be made without departing from the spirit and scope of the following claims.

What is claimed is:

1. A multi-piece golf ball comprising:
    a core having a diameter of 30 to 40 mm, said core being made from a rubber composition mainly containing polybutadiene;
    at least one intermediate layer including an outermost layer having a thickness of 0.5 to 2.0 mm, said outermost layer being made from a non-ionomer based thermoplastic resin; and
    a cover having a thickness of 1.0 to 3.0 mm, said cover being made from material obtained by dispersedly blending at least one kind of silicone powder selected from a silicone rubber powder, a silicone resin powder, and a composite powder thereof, in a main resin component containing an ionomer resin in an amount of 50% by weight or more;
    wherein said core has a hardness corresponding to a deflection in a range of 3.5 to 6.5 mm under an applied load of 100 kg;
    said outermost layer of said at least one intermediate layer has a Durometer D hardness in a range of 20 to 55, and said cover is harder than said outermost layer of said at least one intermediate layer and has a Durometer D hardness in a range of 50 to 70; and
    dimples of the number of 300 to 550 pieces are formed in the surface of said golf ball in such a manner that a dimple total volume ratio VR, which is a ratio of the total of volumes of dimple spaces under the planes surrounded by edges of the dimples in the surface of said golf ball to the total volume of a virtual ball as a result of assumption that no dimple is formed in the surface of said golf ball, is in a range of 0.85% or less;
    wherein the composite powder comprises silicone rubber particles surface coated with a silicone resin.

2. A multi-piece golf ball comprising:
    a core having a diameter of 30 to 40 mm, said core being made from a rubber composition mainly containing polybutadiene;
    at least one intermediate layer including an outermost layer having a thickness of 0.5 to 2.0 mm, said outermost layer being made from a non-ionomer based thermoplastic resin; and
    a cover having a thickness of 1.0 to 3.0 mm, said cover being made from material obtained by dispersedly blending at least one kind of silicone powder selected from a silicone rubber powder, a silicone resin powder, and a composite powder thereof, in a main resin component containing an ionomer resin in an amount of 50% by weight or more;
    wherein said core has a hardness corresponding to a deflection in a range of 3.5 to 6.5 mm under an applied load of 100 kg;
    said outermost layer of said at least one intermediate layer has a Durometer D hardness in a range of 20 to 55, and said cover is harder than said outermost layer of said at least one intermediate layer and has a Durometer D hardness in a range of 50 to 70; and
    dimples of the number of 300 to 550 pieces are formed in the surface of said golf ball in such a manner that a dimple total volume ratio VR, which is a ratio of the total of volumes of dimple spaces under the planes surrounded by edges of the dimples in the surface of said golf ball to the total volume of a virtual ball as a result of assumption that no dimple is formed in the surface of said golf ball, is in a range of 0.85% or less;
    wherein the silicone rubber powder comprises crosslinked dimethylpolysiloxane or methylphenylpolysiloxane microparticulates or both.

3. A multi-piece golf ball according to claim 2, wherein the crosslinked dimethyl polysiloxane and/or the crosslinked methylphenyl polysiloxane are obtained by crosslinking linear dimethyl polysiloxane and/or methylphenyl polysiloxane added with 0.05 mole % or more of vinyl groups by using methyl hydrogen polysiloxane as a crosslinking agent.

4. A multi-piece golf ball comprising:
    a core having a diameter of 30 to 40 mm, said core being made from a rubber composition mainly containing polybutadiene;
    at least one intermediate layer including an outermost layer having a thickness of 0.5 to 2.0 mm, said outermost layer being made from a non-ionomer based thermoplastic resin; and
    a cover having a thickness of 1.0 to 3.0 mm, said cover being made from material obtained by dispersedly blending at least one kind of silicone powder selected from a silicone rubber powder, a silicone resin powder, and a composite powder thereof, in a main resin component containing an ionomer resin in an amount of 50% by weight or more;
    wherein said core has a hardness corresponding to a deflection in a range of 3.5 to 6.5 mm under an applied load of 100 kg;
    said outermost layer of said at least one intermediate layer has a Durometer D hardness in a range of 20 to 55, and said cover is harder than said outermost layer of said at least one intermediate layer and has a Durometer D hardness in a range of 50 to 70; and
    dimples of the number of 300 to 550 pieces are formed in the surface of said golf ball in such a manner that a dimple total volume ratio VR, which is a ratio of the total of volumes of dimple spaces under the planes surrounded by edges of the dimples in the surface of said golf ball to the total volume of a virtual ball as a result of assumption that no dimple is formed in the surface of said golf ball, is in a range of 0.85% or less;
    wherein the silicone resin powder comprises cured polyorganosilsesquioxane microparticulates.

5. A multi-piece golf ball according to claim 4, wherein the cured polyorganosilsesquioxanes is obtained by hardening siloxane bonds in a three-dimensional network expressed by a formula $(RSiO_{3/2})_n$.

* * * * *